Sept. 21, 1943.　　　　　　R. AMSLER　　　　　　2,329,813
HEAT MEASURING METHOD AND APPARATUS
Filed May 6, 1939
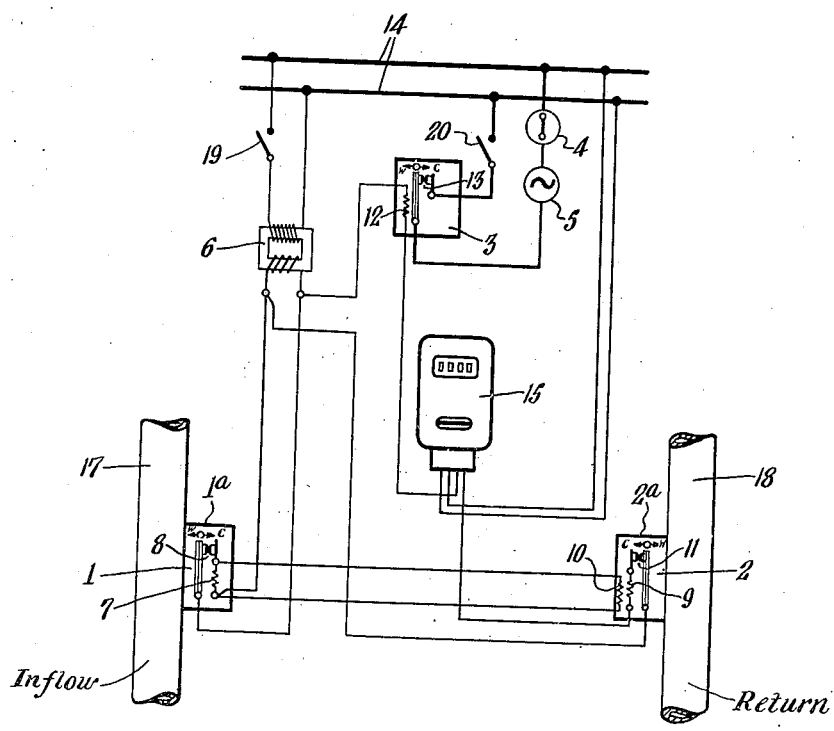

Patented Sept. 21, 1943

2,329,813

UNITED STATES PATENT OFFICE 2,329,813

HEAT MEASURING METHOD AND APPARATUS

Robert Amsler, Zug, Switzerland, assignor to Landis & Gyr, A.-G., Zug, Switzerland, a body corporate of Switzerland Application May 6, 1939, Serial No. 272,097
In Switzerland November 4, 1938

6 Claims. (Cl. 73—193)

The invention relates to a novel and useful method and means for measuring heat energy consumption in circulating heating systems, and more particularly to such a method and means applied to a fluid-circulation heating system, wherein the differences in heat exchange between calibrated and controlled heat radiating devices applied to the inflow conduit and to the return conduit of the circulating system are measured to indicate the heat consumption or heat loss of the heating system.

The invention consists in the novel methods, steps, sequences, mechanisms and combinations disclosed in the specification and pointed out in the appended claims.

Objects and advantages of the invention are set out in part hereinafter, and in part will be obvious to those skilled in the art or may be learned by practice with the invention.

The accompanying drawing is a diagrammatic representation of one manner of practicing the method and shows one form of apparatus for practicing the invention.

The invention relates to a process for measuring quantities of heat of a heating plant and which meets those requirements by comparatively simple means. According to the invention, the difference is found of the quantities of heat given up by thermostats with auxiliary heating, that is, having a constant temperature to the delivery or inflow pipe and to the return pipe, respectively, of a circulating fluid heating system, which difference is registered by a meter. This difference of heat quantities is proportional to the quantity of heat supplied. This will be clear from consideration of a closed space having a heating system and a thermostatic control therefor, such as a contact switch. Such a space requires a mean quantity of heat energy which is exactly equal to its heat loss in order to maintain a constant temperature. The temperature of the closed space will remain constant as the thermally-controlled contact switches out the heating system always at the same temperature, the heat units supplied per unit of time corresponding on an average to the heat units dissipated per unit of time. Therefore, the ratio of the period of switching-in to the period of switching-out by the thermally-controlled contact will be controlled in accordance with the outside temperature which obtains, so that, for example, with decreasing external temperature the duration of switching-in of the intermittently actuated contact will become longer.

If a constant temperature thermostat is placed in heat exchanging relationship with any body at a lower temperature, a part of the heat in the thermostat will pass into this body and the remainder into the surrounding space when the temperature in the interior of the thermostat is higher than that of the surrounding air and of the body. Such a thermostat will be termed a relatively high-temperature thermostat. Consequently, if a thermostat is fixed on a pipe or conduit of a hot water heating system, the energy consumed in heating the thermostat, that is, in maintaining it at its predetermined constant temperature, will be a measure of the outflow of heat from the thermostat to the heating pipe and to the surrounding air.

If two such thermostats be placed, respectively, in heat exchange relation with the delivery and return pipes of the circulating heating system, and if these two thermostats are exposed to the same surrounding temperature and are also adjusted to the same switching-out temperature, it will be seen that the quantity of heat which is given up by the thermostats to their respective heating pipes is at any moment equal to the quantity of heat which the pipes are able to carry away from the thermostats. The return flow pipe is then able, as compared with the inflow pipe, to carry away a correspondingly greater quantity of heat from its thermostat. It can therefore be deduced from this that actually the difference between the heat given up by the inflow pipe thermostat to the inflow pipe and the heat given up by the return pipe thermostat to the return pipe is a direct measure of the heat given up by the heating system to the space to be heated. Therefore if this difference of quantities of heat is registered by a meter, the determination of the quantity of heat consumed in the heating of the space may be determined.

The thermostats may be electrically heated, as by using heating coils, and may cooperate with an electricity meter. The apparatus is illustratively so constructed that there is used in addition to the two heating coils of the two thermostats, a supplementary heating coil in the return conduit thermostat which is in parallel with the heating coil of the thermostat in heat-exchange relation with the inflow pipe and acts as an additional heating means for the thermostat which is in heat-exchange relation with the return pipe. The primary heating coil of this return conduit thermostat is in series with an electricity meter which is used to indicate the heat radiation of the heating system, as later described. The electricity meter registering the energy consumption of the return conduit thermostat can be an ampere squared-hour meter, a watt-hour meter or a time meter.

As embodied, an apparatus embodying the invention is applied to the inflow and return conduits of a heating system employing a circulating heating fluid. Therein one constant-temperature thermostat 1 is mounted in heat-exchange relation with the inflow pipe 17 of the heating system, and is shown with its casing 1a mounted directly on the pipe. The other constant-temperature thermostat 2 is mounted in heat-exchange relation with the return pipe 18 of the heating system and likewise is shown with its casing 2a in direct contact with the pipe. The two thermostats are set to maintain equal temperatures. Within the casing of thermostat 1 is a heating coil 7, in circuit with a transformer 6, taking current from the mains 14. Within the casing of the thermostat 2 is a heating coil 10 which is in parallel with the coil 7 of the thermostat 1. The thermostat 1 has a thermally-controlled contact 8, which governs the circuit in which are both heating coil 7 of thermostat 1 and heating coil 10 of thermostat 2. Thus the current is turned on and cut off from coils 7 and 10 concurrently by contact 8. Additional heating means are provided within the casing of the thermostat 2, comprising a heating coil 9 which is in a different circuit, in which is a thermally-controlled contact 11. This circuit is also taken off the transformer 6 and in this circuit is a suitable energy-measuring device, such as a watt-hour meter 15, although other types of meter may be employed, such as an ampere squared-hour meter, or a time meter. Thereby the amount of energy consumed in heating the coil 9 can be measured and registered. Preferably and as embodied, an external thermostat 3 is included in the circuit of the heating coil 9 on the other side of the meter 15. The thermally-controlled contact 13 of the thermostat 3 controls a circuit in which is a regulating device 5 controlling the heat supply, and a thermostat 4 which is acted upon by the boiler, this circuit being across the mains 14.

Referring now to the diagrammatic showing in the drawing, and the manner of operation, the circuit arrangement is shown in the position of rest. Under this condition, switches 19 and 20 are open and contacts 8, 11, 13 of thermostats 1, 2, 3 are closed. On starting the heating plant by closing the switches 19 and 20, heating coils 7, 9, 10 will heat their associated thermostats 1, 2 up to the switching-out temperature which, for example, may be 90°. As soon as thermostats 1 and 2 have reached the switching-out temperature, contacts 8 and 11 of thermostats 1 and 2 are opened.

Upon contact 8 opening, thermostat 1 cools to a certain amount when its contact 8 will again close. This operation is repeated intermittently in such manner that with heat given up to the surrounding air and to inflow pipe 17, the temperature in applied thermostat 1 remains substantially constant, the ratio of the switch-in time and the switched-out time being varied according to the temperature of the inflow pipe. The higher the temperature of the inflow pipe becomes, the shorter is the period of time of switching-in of contact 8 during a certain interval of time, and with it the smaller the supply of heat by heating coil 7.

As long as the temperatures of the water in inflow pipe 17 and in return pipe 18 are the sam which is the case when heating of the building the like commences, supplementary heating co 10 of thermostat 2 connected with heating co 7 of thermostat 1 will develop so much heat th the temperature of thermostat 2 does not fa below the switching-in temperature. Cons quently contact 11 of thermostat 2 cannot l closed, and therefore meter 15 does not con mence recording.

With rising temperature of the inflow wate the heat output of heating coil 7 will, as alread mentioned, be smaller, i. e. will occur for short periods of time. Naturally, also, the heat energ supplied to supplementary heating coil 10 wi then also be correspondingly less. The tempera ture in thermostat 2 will consequently fall, that contact 11 is closed. Heating coil 9 thereby switched in and assists in supplying th deficiency of heat. A definite quantity of hea corresponding to the heat given up to the retur flow pipe 18 and to the surrounding space, is thu produced in thermostat 2. In this manner sup plementary heating coil 10 supplies a quantity c heat which corresponds to the heat given up b the thermostat 1 to inflow pipe 17. Cons quently, heating coil 9 will produce the remainde of the heat to be given up which thus represent the difference of the heat given up by thermosta 1 to inflow pipe 17 and that given up by thermc stat 2 to return flow pipe 18, and thus the quan tity of heat expended by the heating systen Here, the ratio of the periods of switching-i and of switching-out of contact 11 of thermc stat 2 will also vary as with contact 8 of thermc stat 1, and with decreasing heat ouput of heat ing coil 10, the switching-in period of contac 11 per unit of time will be greater. The hea output of heating coil 9 is now registered by elec tricity meter 15, as this meter, on the intermit tent closing of contact 11, is also switched in wit the heating current circuit of heating coil 9.

The maximum supply of heat by the heatin system of the building will take place when th difference between the inflow and the retur flow temperatures is a maximum and the diffei ence of the heat losses between thermostats and 2 is thus also at a maximum. Under thes circumstances contact 11 of return flow thermc stat 2 remains closed, and thus the heat outpt of heating coil 9 attains its highest value. Con sequently in the case of the greatest differenc occurring between the inflow and return flo temperatures, the meter also registers the maxi mum supply of heat.

With respect to the regulating process, it ma be briefly mentioned that, since heating coil 1 of the externally located thermostat 3 is in serie with heating coil 9 of thermostat 2, the exter nally-located thermostat 3 will control regulat ing member 5 of the heating installation in ac cordance with the quantity of heat to be suppliec The boiler thermostat 4 has for its object to in terrupt the current circuit of electrically-con trolled regulating member 5 when the maximur permissible temperature of the water in the heat ing boiler is reached.

The method of measurement of the supply o heat is not limited to the apparatus shown in th drawing, and other embodiments of measurin apparatus can be employed.

The invention consists in the novel steps, se quences, elements and combinations as pointe out in the accompanying claims, and it will b understood that departures may be made from the specific forms shown and described without departing from the principles of the invention and without sacrificing its chief advantages.

What I claim is:

1. An apparatus for measuring the quantities of heat supplied to a heating system by a circulating heating fluid, including in combination a thermostat in heat-exchange relation with the inflow conduit at an entrance point to the space to be heated, a second thermostat maintained at a given temperature with reference to the first thermostat and in heat-exchange relation with the return conduit at an exit point from the space to be heated, means controlled by the first thermostat for supplying equal quantities of heat to both said thermostats, means controlled by the second thermostat for supplying additional heat to the return conduit thermostat and means for measuring the heat supplied to said additional heating means of the return conduit.

2. An apparatus for measuring the quantities of heat supplied to a heating system by a circulating heating fluid, including in combination an electrically-heated thermostat in heat-exchange relation with the inflow conduit at an entrance point to the space to be heated, an electrically-heated second thermostat maintained at a given temperature with reference to the first thermostat and in heat-exchange relation with the return conduit at an exit point from the space to be heated, said thermostats including means controlled by the first thermostat for supplying equal quantities of heat to both thermostats and means controlled by the second thermostat for supplying additional heat thereto, and means for measuring in terms of electrical energy the difference in the heat loss to the heating system between the two thermostats.

3. An apparatus for measuring the quantities of heat supplied to a heating system by a circulating heating fluid, including in combination a thermostat in heat-exchange relation with the inflow conduit at an entrance point to the space to be heated, a second thermostat maintained at the same temperature as the first thermostat and in heat exchange relation with the return conduit at an exit point from the space to be heated, electrical means controlled by the first thermostat for equally heating both thermostats, electrical means controlled by the second thermostat for additionally heating the return conduit thermostat, and means for measuring the electrical energy supplied to said additional heating means.

4. An apparatus for measuring the quantities of heat supplied to a heating system by a circulating heating fluid, including in combination a thermostat in heat-exchange relation with the inflow conduit, said thermostat having a thermally controlled electric contact, a second thermostat maintained at the same temperature as the first thermostat and in heat-exchange relation with the return conduit, a heating coil in each of said thermostats, said coils being in parallel in a circuit controlled by the thermally-controlled contact of said inflow-conduit thermostat, an additional heating coil in said return-conduit theremostat controlled by the second thermostat, and an electricity meter in circuit with said additional heating coil.

5. The method of measuring the quantities of heat supplied to a heating system by a circulating heating fluid which comprises maintaining two bodies at the same temperature, one in heat exchange relation to the supply of heating fluid, the other in heat exchange relation to the return of heating fluid, both bodies being above the temperature of the heating fluid, and measuring the energy consumed by the body giving heat to the returned heating fluid in excess of that supplied to the first body to determine the heat loss of the heating system between said bodies.

6. The method of measuring the quantities of heat supplied to a heating system by a circulating heating fluid which comprises maintaining two bodies at the same temperature by supplying electric energy thereto, one in heat exchange relation to the supply of heating fluid, the other in heat exchange relation to the return of heating fluid, both bodies being above the temperature of the heating fluid, and measuring the energy consumed by the body giving heat to the returned heating fluid in excess of that supplied to the first body to determine the heat loss of the heating system between said bodies.

ROBERT AMSLER.